Figure 1:
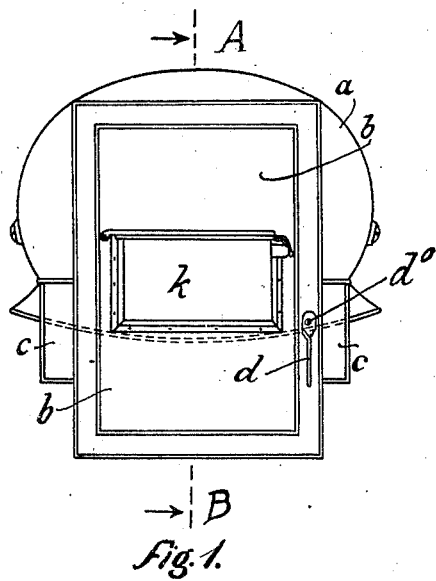

Jan. 22, 1929.  H. F. C. BRINKHAUS  1,699,652

FACE PROTECTING DEVICE

Filed Oct. 29, 1925   3 Sheets-Sheet 1

INVENTOR
HERMANN F. C. BRINKHAUS
BY
ATTORNEYS

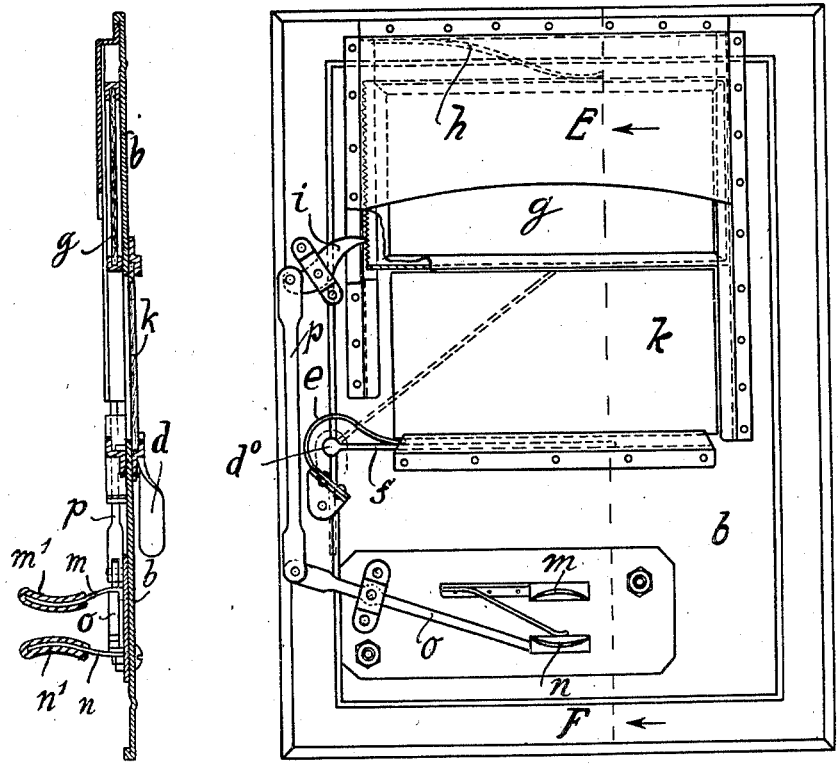

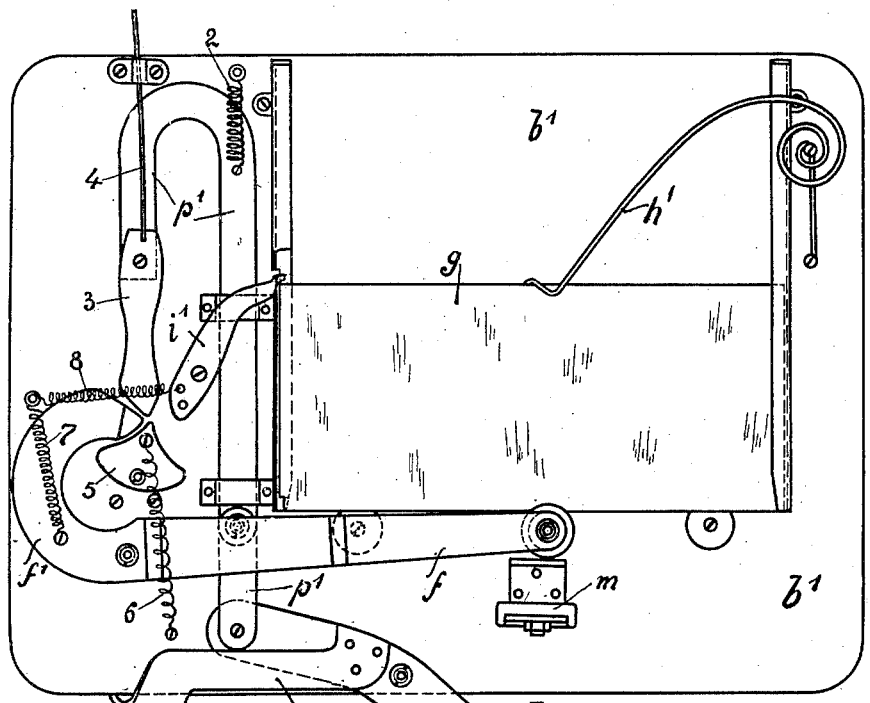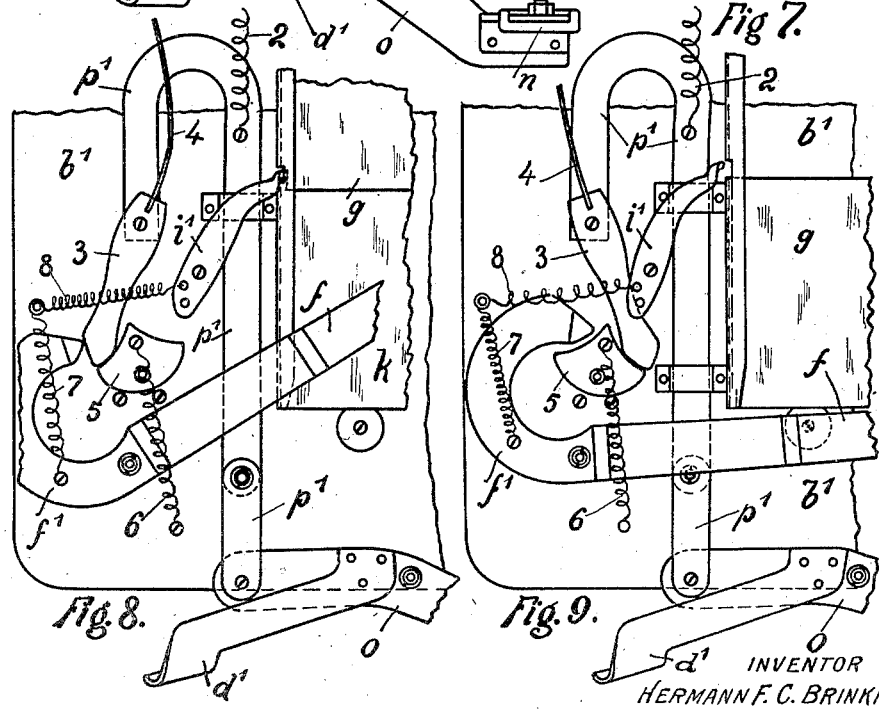

Patented Jan. 22, 1929.

1,699,652

UNITED STATES PATENT OFFICE.

HERMANN FRIEDRICH CARL BRINKHAUS, OF RENDSBURG, GERMANY.

FACE-PROTECTING DEVICE.

Application filed October 29, 1925, Serial No. 65,530, and in Germany November 6, 1924.

The present invention relates to improvements in face protecting devices to be used in electro- and autogenous metal working.

Various appliances for the protection of the face in the shape of hoods or caps the front part of which serves as a face-guard or shield are well known, such appliances being usually provided with a window of non-colored glass or only with a peep-hole and with a movable protecting window of colored glass either in front or behind, to protect the wearer of the appliance, especially his eyes, when working metals autogenously or electrically (welding or cutting) against noxious effects of an optical nature (by the effect of light) as well as against those of a mechanical nature (metal particles cracked or thrown off).

With these known protecting devices the moving away and back again of the colored protecting window is done by a contrivance movable by hand, which contrivance is similar to a visor of a knight's helmet. It has also been proposed to construct such contrivances in such a way that the wearer might elevate it by a downward movement of his lower jaw without the assistance of his hands. But this proposal has remained without practical results, not being able to fulfill its purpose, because the wearer of the apparatus, during the whole time that the window is to remain open, would have to keep his lower jaw down to the lowest point with his mouth open, thus causing cramp in the muscles of the jaw.

The object of this present invention is to provide a mechanism which will move the protecting window from and return the same to the field of view by the single action of a contrivance to be actuated by the teeth, or as an alternative to effect the moving away and back again of the protecting window by twice using the biting-contrivance, or thirdly to effect the moving away and back again of the protecting window by hand only.

In the drawings the invention is represented by two different embodiments.

Figure 2:
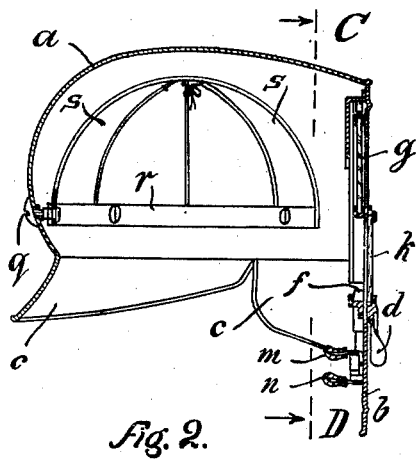
Figure 3:
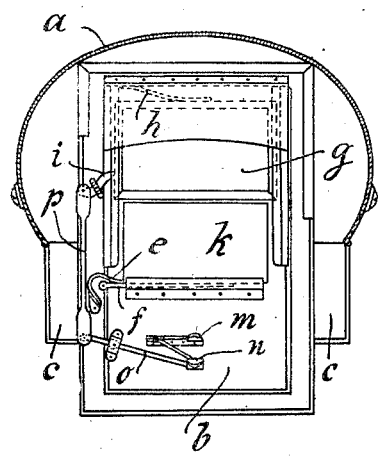
Figure 4:
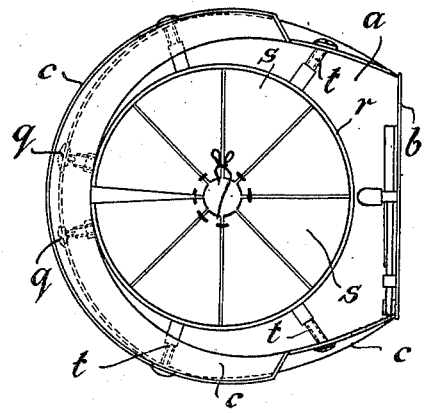

Fig. 1 is the front view of a protecting hood, the fore-part of which is the protective shield according to the invention. Fig. 2 is a section on the line A—B of Fig. 1. Fig. 3 is a section on the line C—D of Fig. 2. Fig. 4 is a plan of the face-guard turned upside down. Fig. 5 is an inner view of the front part of the face-guard, drawn on a larger scale; the window being in the elevated or non-protecting position. Fig. 6 is a section on the line E—F of Fig. 6. Fig. 7 is a view similar to Fig. 5, showing a modification of of the front plate or shield drawn also on a larger scale; the protecting window being in the lower protective position. Fig. 8 shows the position of the different parts after the biting tappets have been moved to raise the said window. Fig. 9 is a view similar to Fig. 8 showing the position of the different parts, after the biting tappets have been moved together, in order to disengage the pawl holding the protecting window.

The mechanism is easily understood by explaining its working or function.

After putting on the face-guard $a$, made of sheet metal (aluminum, tin and the like) and equipped with a front $b$ and a side and neck protective brim $c$, the wearer (see Figs. 1–6) unless the colored protecting window $g$ is in its raised position, rocks the hand lever $d$, fixed on the outer end of a pin or journal $d^0$, whereby the lever arm $f$, fixed on the inner end of the said journal and adapted to extend horizontally under the protective window $g$ is rocked upwards. The free end of the lever $f$ pushes the slidable window $g$ resting loosely on it, into its upper position, where it is held by a pawl $i$, which catches into a toothed rack formed on the side frame of protecting window $g$ (Fig. 5). In this upper position the window $g$ is acting against a spring $h$, which will be compressed thereby and on a later releasing of the protecting window will give it the first downward impetus. After releasement, the combination of the levers $d$, $f$ will be swung back into its resting position by a returning spring $e$.

After this the wearer of the apparatus, looking through the clear window $k$ in the front wall (Figs. 2, 3, 5 and 6), will make the necessary preparations for his welding or cutting work, seizes his welding or cutting torch or burner, and lets the protective window $g$ slide into its protecting position inside the window $k$, by grasping the tappets $m$ and $n$ located inside wall $b$ between the teeth and shifting the movable tappet $n$ against the stationary tappet $m$. Fixed or removable caps of rubber or similar material $m^1$, $n^1$ (Fig. 6) will make the working of these tappets more pleasant and also prevent transferring infectious diseases. By moving the tappet $n$, pawl $i$ is disengaged by a lever and rod connection $o$, $p$, whereupon the protecting window slides down into its lower or protective position, partly by its own weight, but also assisted by a spring $h$ pressing against the upper edge of the window $g$. The wearer of the face shield observes his work etc. now through the colored protective pane covering the window $k$, by which pane he is effectively protected against noxious influences particularly of the superviolet light, and by the other parts of the hood also against sparks from his work and against red-hot metal particles as well as radiating heat.

On interrupting or finishing his work the protective window $g$, can be pushed back into its upper end position in order to gain better and more distinctive observation, unless the apparatus be taken off entirely.

In the interior of the hood a cap for the head is fitted which consists of an adjustable bandeau $r$ with leather pieces of sector shape $s$, which surrounds the forehead and back of the head and which can be adjusted in width by screws $q$. The free ends of the leather pieces are laced together towards the centre as will be seen from Figs. 2 and 4. Adjustable bolts $t$ or similar means keep the hoop $r$ and also the head-cap at a certain distance from the wall of the hood proper $a$, in order to provide an air space or jacket between the two, which serves to isolate and protect the head of the wearer still further against the effect of radiant heat.

The carrying out of the invention can also be done in such a way that the removing or raising of the colored protective window is effected by the motion of the movable bite-tappet, in such a way that by once bringing together the tappets the protective window is removed from the field of view of the eyes. After letting go the tappets the movable or operative parts, with the exception of the protective window, caught by the pawl, will return to their position of rest, so that by a renewed bite for the purpose of bringing together the tappets the operative parts will effect the release of the pawl, the window $g$ will then slide down into its protective position in front of the eyes. After letting go the bite-tappets the operative parts will return however into another position of rest, such that on the next bite a raising of the protective window into the out of the way position will take place, and so on.

A protective shield $b^1$ with the arrangement as just explained is represented in Figs. 7–9. Lever $o$ carrying the bite-tappet $n$ is articulated to a slide bar $p^1$, the upper end of which is bent back upon itself in the manner shown. The end of the lever $p^1$, is provided with a tongue 3 movable to both sides, but normally retained in the position indicated in Fig. 7 by a plate-spring 4 or a similar device. Underneath the free end of the tongue there is a heart-shaped cam 5 tiltable to both sides, which is held by a spring 6 in either end position, according to whether it has been tilted to the right or left over its dead point by the tongue. In Fig. 7 the cam 5 is in the right-hand end position. The lever $f$ which serves to raise the protective window $g$ has on the other side of its pivot a bent arm $f^1$ which extends with its free end up to the cam 5 and the tongue 3. A spring 7 secures lever $f$, $f^1$ in the position of rest as shown in Fig. 7. At the side of the protective window $g$ there is pivoted to the shield $b^1$ a pawl $i^1$, which under the action of a spring 8 keeps the protective window $g$ in its raised position by catching in a recess on its side edge. To the lever $o$ there is also fixed a finger-handle $d^1$, projecting to the front side of the protective shield $b^1$.

When the tappets $m$ and $n$ are moved together by the teeth, the tongue 3 is pushed down, until it strikes the cam 5. By the latter it is steered and guided in such a way that it pushes itself between the cam 5 and the arm $f^1$ of the lever $f$. By this action the lever-arm $f$ is swung upward and the protective window $g$ is raised against a spring $h^1$ into an upper or out of the way position, in which it is caught and kept by the pawl $i^1$. At the same time the tongue 3 reverses the cam 5 into its left end position. This position of the different parts is shown in Fig. 8. When the wearer of the protective shield ceases to exert any pressure upon the tappets the latter will move away from each other. The parts will then return from the position Fig. 8 to their position of rest Fig. 7, only the protective window will remain caught in its raised position and the cam 5 will take the left end position as represented in Fig. 8. When now the bite tappets are moved together again, the tongue 3 will slide down on the right edge of the cam. It is thereby pushed aside and against the free arm of pawl $i^1$ in order to lift it out of the recess for the purpose of letting the now released window slide down into the protecting position (Fig. 7). The downward movement of the tongue 3 tilts the cam 5 and its point respectively again to the right. This position of the different parts is shown in Fig. 9. After the release of the bite tappets all parts are returning from the position Fig. 9 into the position Fig. 7.

By pulling down and releasing the finger handle $d^1$ twice in succession, the appliance can be operated and made effective in exactly the same way as by twice moving together and releasing the bite tappets.

I claim:

1. A face protecting device for electro- and autogenous metal working comprising a protective face shield provided with a peephole therein, a window slidably mounted in said shield and adapted in one position to cover said peephole, means for moving said window in its own plane away from said peephole to permit an unobstructed view through the latter, a slot in said window, a latch cooperating with said slot for retaining the protective window in its inoperative position away from the peephole, and manually operable means for disengaging the latch and slot mechanism to release the window and permit the same to move back into position adjacent the peephole.

2. A face protecting device for electro- and autogenous metal working comprising a protective face shield provided with a peephole therein, a window slidably mounted in said shield and adapted in one position to cover said peephole, said window being slidable into an inoperative position remote from the peephole to permit an unobstructed view through the latter, means for moving the window away from the peephole into its inoperative position, recesses in an edge of the window, a member cooperating with said recesses for retaining the window in its inoperative position, means operable by movement of the jaw of the wearer for disengaging said member and recesses and thus releasing the window to permit it to return to a position adjacent the peephole, and means for urging the window into its position adjacent the peephole.

3. In a face protecting device for electro- and autogenous metal working consisting of a face protecting shield provided with a peephole therein, a colored window slidably mounted in said frame and adapted in its normal position to cover said peephole, said window being slidable into an inoperative position remote from the peephole, a lever pivoted to said shield and adapted to move said window from its position adjacent to the peephole to its inoperative position, a member engaging a side of the window for retaining the window in its inoperative position, means for releasing the window retaining means, and means adapted to be operated by a movement of the jaws of the wearer for actuating the releasing means.

4. A face protecting shield provided with a peephole, a window adapted in its normal position to cover the peephole and movable into an inoperative position remote from the peephole to permit an unobstructed vision through the latter, means for moving the window from its normal to its inoperative position, a pawl for retaining the window in its inoperative position, and means for releasing said pawl to permit the window to return to its normal position, said releasing means including relatively movable mouth-pieces adapted to be actuated by the teeth of the wearer, and connections between one of said mouth-pieces and said pawl.

5. A face protecting shield provided with a peephole, a window adapted in its normal position to cover the peephole and movable into an inoperative position remote from the peephole to permit an unobstructed vision through the latter, a spring for returning the window to its normal position, said spring being compressed by the movement of the window from its normal to the inoperative position, means for moving said window from its normal to its inoperative position, said means including a fixed mouth-piece, a movable mouth-piece, and a connection between the movable mouth-piece and the window, said connection being operable by movement of the movable mouth-piece toward the stationary mouth-piece, means for retaining the window in its inoperative position, and means operable by movement of the movable mouth-piece towards the stationary mouth-piece for releasing the pawl to permit the window to return to its normal position.

6. A face protecting shield provided with a peephole, a window adapted in its normal position to cover the peephole and movable into an inoperative position remote from the peephole to permit an unobstructed vision through the latter, a lever pivoted to said shield, one end of said lever being adapted to engage said window and move the latter from its normal to its inoperative position, the opposite end of said lever being curved upwardly and terminating in a cam surface, a pawl adapted to engage said window and retain it in its inoperative position, the tail of said pawl terminating in proximity to the cam surface of the lever, a heart-shaped cam pivoted to said shield below the cam surface of the lever and the tail of the pawl, said cam being mounted for a limited movement towards each side of the pivot, a spring for holding the cam in each off-center position thereof with respect to the pivot, a stationary mouthpiece, a movable mouth-piece, a slide member connected to said lever, said slide member terminating above the said cam, a cam member pivoted to the end of the slide member, a spring for normally retaining the cam member in line with the pivot of the cam, said cam member being directed by the cam into engagement with the cam surface on the window actuating lever or into engagement with the tail of the pawl upon actuation of the movable mouth-piece to either move the window from its normal to its inoperative position, or to release the pawl and permit the window to return from its inoperative to its normal position.

Dr. Med. HERMANN FRIEDRICH CARL BRINKHAUS.